Dec. 21, 1948.    H. DAHNKE    2,456,626
DEVICE FOR THE CONTROL OF FLOW OF FLUIDS
Filed May 15, 1945

INVENTOR.
HENRY DAHNKE
BY
ATTORNEYS

Patented Dec. 21, 1948

2,456,626

UNITED STATES PATENT OFFICE 2,456,626

DEVICE FOR THE CONTROL OF FLOW OF FLUIDS

Henry Dahnke, Banning, Calif.

Application May 15, 1945, Serial No. 593,913

3 Claims. (Cl. 138—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to governors, and more particularly, to devices for the control of flow of fluid.

This invention is an improvement of the governor shown in my Patent No. 2,009,967, dated July 30, 1935. Devices of this nature previously have required a number of moving parts. These prior devices required frequent adjustment and the wear thereon was great. These prior devices were necessarily of a delicate construction in that it was necessary that they be operated by the flow of fuel. Inertia of the parts in the prior devices caused jumping of the elements thereof to extremes of their movement.

It is, accordingly, an object of my invention to overcome the above and other defects in present governors for fluid, and it is more particularly an object of my invention to provide control means for the flow of fluid which is simple in construction, efficient in operation, which has no moving parts and is economical in cost.

Another object of my invention is the provision of a governor which takes advantage of the laws of the flow of a fluid.

Another object of my invention is to provide a device which is adapted to be inserted in a connection between the carburetor and the intake manifold of an engine, or in any other position where the control of a fluid is desirable.

Another object of my invention is to provide a device for the control of flow of fluid which is automatically adjustable.

Another object of my invention is to provide a means whereby the flow of fuel will be automatically and gradually diminished, by its own flow, when the engine exceeds desired maximum speed.

Other objects of my invention will become evident from the following detailed description, taken in conjunction with the accompanying drawings, in which.

Figure 1:
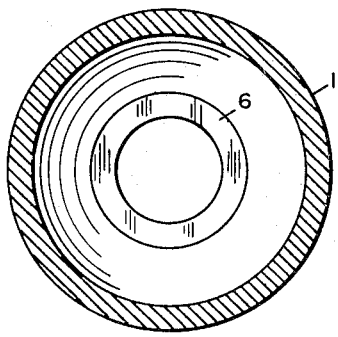
Figure 1 is a cross-sectional view taken on the line 1—1 of Figure 2.
Figure 2:
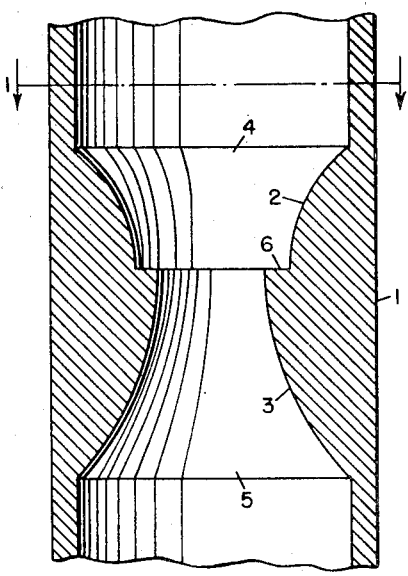
Figure 2 is a longitudinal transverse sectional view, fragmentary in form, of my novel device for controlling the flow of fluid.
Figure 3:
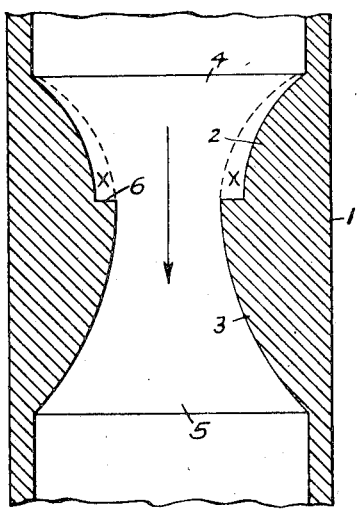
Figure 3 is a diagrammatic view showing the pressure area of my novel device upon the flow of fluid.

Referring now to the drawings, Figures 1 2 and 3 show the body 1 of a device for controlling the flow of fluid having arcuate, inwardly projecting portions 2 and 3 forming apertures 4 and 5, the apex of aperture 4 being greater in diameter than the apex of aperture 5 thereby forming a shoulder 6 to set up a pressure area shown by dotted lines in Figure 3, when the direction of the flow of fluid is as shown by the arrow. The projecting portions 2 and 3 may be made in different arcuate or straight line forms without departing from the spirit of my invention.

When the fluid flows in the direction indicated by the arrow in Figure 3, the pressure area within the dotted lines, of streamlined form, is built up as the pressure of the fluid is built up. The size and area of X is directly in proportion to the velocity of flow of fluid. If the velocity of flow of fluid increases, the size of pressure area X increases; if the velocity of flow decreases, the size of the pressure area X decreases in proportion. It will be evident that the amount of fluid, whether it be gas or liquid, passing through the receding aperture 5, is always the same owing to the law that the area times velocity at one point in the line is equal to the area times velocity at another point in the line. If the direction of flow of fluid is reversed from that shown in Figure 3 by the arrow, the area X becomes a turbulence area which builds up on increase in the flow of the fluid and therefore exercises control over the flow of fluid.

Assuming the fluid to be moving in the direction of the arrow in Figure 3, the pressure area X is built up, due to the projection or shoulder 6 in the path of the flow of the fluid, thereby decreasing the cross-sectional area of the aperture 4 wherein fluid may flow therethrough.

At low velocity flow of fluid, the pressure area X is negligible and of small dimensions. As the speed of the engine passes its predetermined maximum speed, pressure area X increases with the increase of the flow of the fluid through the fuel passage, thereby increasing the effect of the diminished passage obtained, and the speed of the engine is reduced to an adjusted maximum speed.

The control of the speed of the engine is a function of the pressure area X diminishing the sides 2 of the aperture through which the fluid flows.

When the correct automatic adjustment is obtained in the desired maximum speed, the mixture flows smoothly through the fluid passage and apertures 4 and 5 due to the synthetically set up streamlined passage, which results in little or no power absorption by the control device up to the time when the engine reaches desired maximum speed. Furthermore, said synthetic streamlining is built up gradually with a gradual increase.

It is evident from the foregoing that I have provided a control device for fluid in which no mechanical moving parts are used and advantage has been taken of the laws of flow of fluid, whereby the area of the passage for the fluid is gradually increased and reduced by corresponding increase and reduction of the pressure area and drag, which forms what may be termed a built-up or synthetic fluid passage, controlled by the speed of flow of the mixture.

It will be evident, also, that when the flow of fluid is opposite to the flow as shown by the arrow in Figure 3, area X becomes a turbulence area which provides a drag on the fluid passing therethrough and, therefore, tends to control the flow of fluid, the same as though the flow of fluid were in the direction of the arrow directly against the shoulders 6.

It will be evident from the foregoing that I have provided an automatically operated device which requires no adjustment, and the flow of fluid through a passageway is automatically controlled between predetermined limits.

Various changes may be made in the specific embodiment of my invention, without departing from the spirit thereof or from the scope of the appended claims.

What I claim is:

1. A fluid flow governor comprising a Venturi tube for automatically restricting the flow of fluid upon increase of velocity of flow, said Venturi tube comprising two separate opposite portions abutting at the throat of the tube and having fluid passageways flaring outwardly from the throat of the tube, the outwardly flaring passageway of one of said portions being of smaller cross-sectional area than the other passageway at the throat of the tube whereby said portions form a right angle annular shoulder in the throat of the tube.

2. A fluid flow governor comprising a fluid passageway for automatically restricting the flow of fluid upon increase of velocity of flow, said passageway comprising a Venturi tube of two separate opposite outwardly flaring longitudinal convex profile portions abutting at the throat of the tube, one of said portions being of smaller cross-sectional area than the other of said portions at the throat of the tube thereby forming an annular flat shoulder in the throat of the tube.

3. A fluid flow governor comprising a fluid passageway for automatically restricting the flow of fluid upon increase of velocity of flow, said passageway comprising a Venturi tube of two separate opposite outwardly flaring longitudinal profile portions abutting at the throat of the tube, one of said portions being of smaller cross-sectional area than the other of said portions at the throat of the tube thereby forming in the throat of the tube a flat shoulder at right angles to the axis of the tube.

HENRY DAHNKE.

REFERENCES CITED

The following references are of record in the file of this patent:

UNITED STATES PATENTS

| Number | Name | Date |
| --- | --- | --- |
| 1,498,682 | Dailey | June 24, 1924 |
| 1,657,663 | Devereux | Jan. 13, 1928 |
| 1,663,998 | Schmidt | Mar. 27, 1928 |
| 1,776,741 | Schwab | Sept. 23, 1930 |
| 1,802,766 | Kerr | Apr. 28, 1931 |
| 1,865,795 | Schnitter | July 5, 1932 |

FOREIGN PATENTS

| Number | Country | Date |
| --- | --- | --- |
| 811,499 | France | April 15, 1937 |